United States Patent Office 3,220,855
Patented Nov. 30, 1965

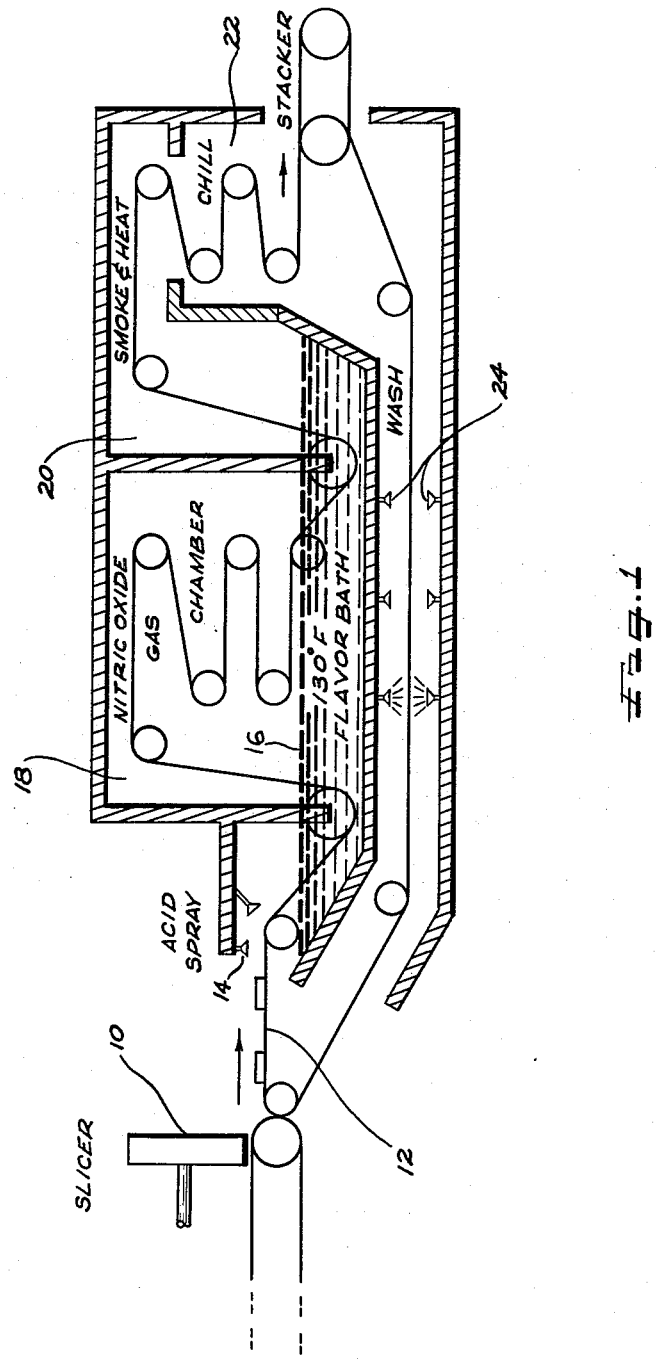

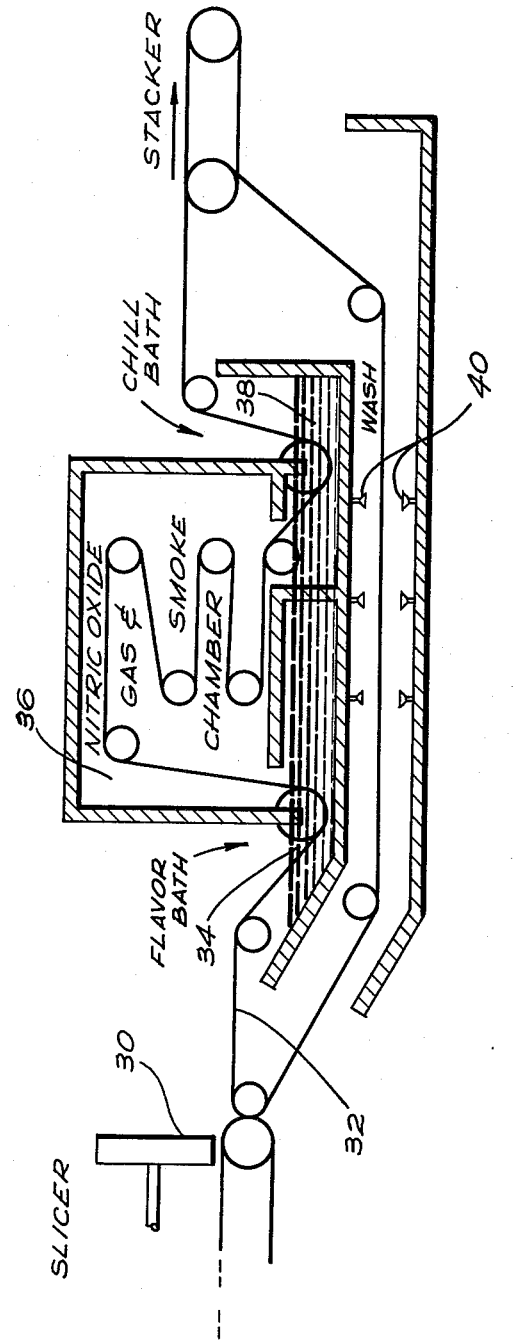

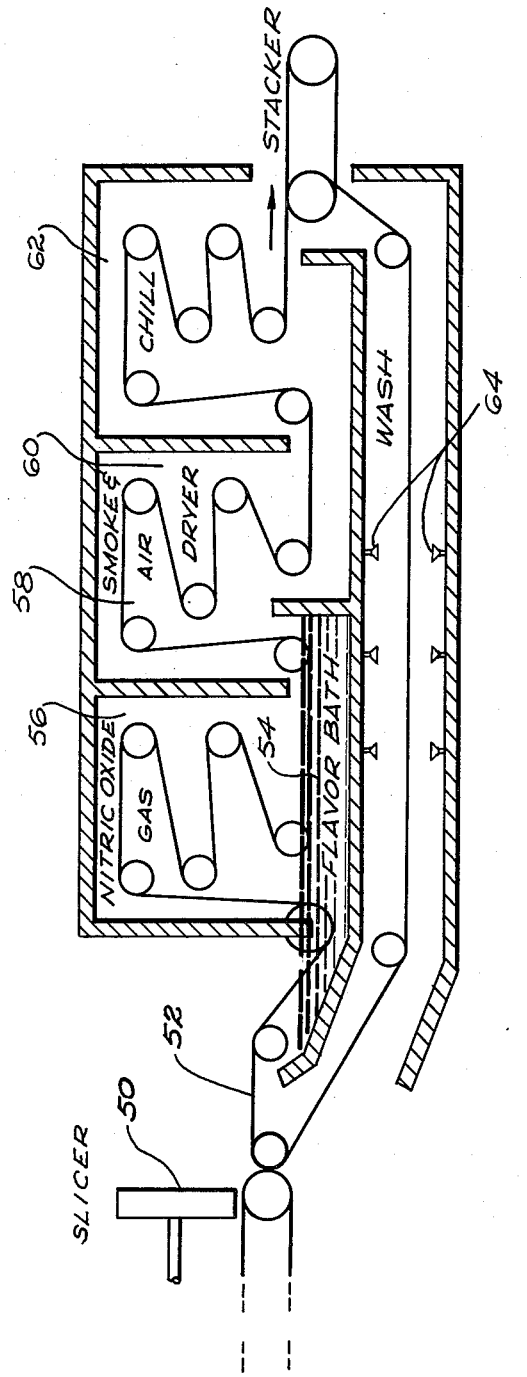

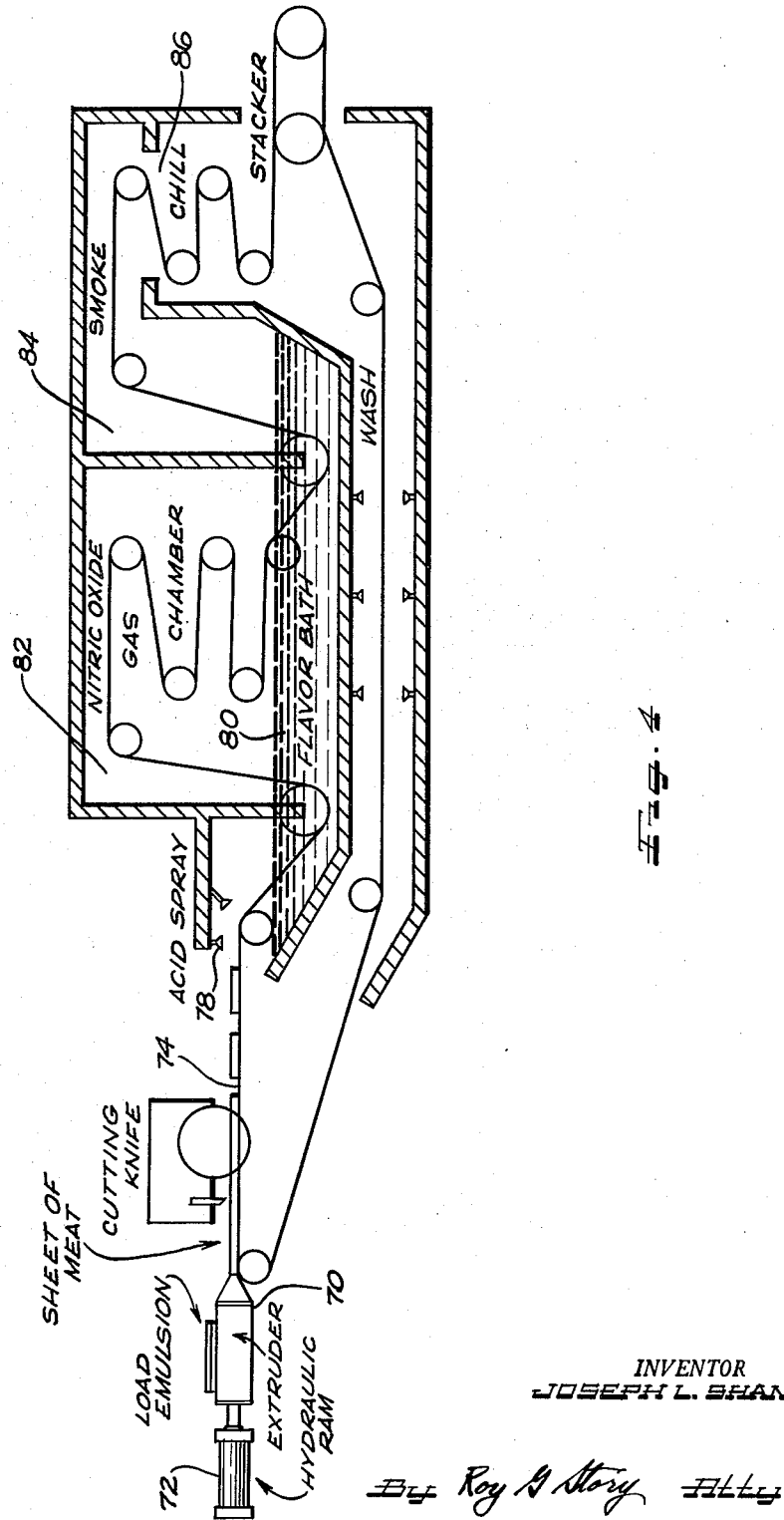

3,220,855
MEAT CURING PROCESS
Joseph L. Shank, Country Club Hills, Ill., assignor, by mesne assignments, to Robert H. Harper, Fort Atkinson, Wis.
Filed July 3, 1962, Ser. No. 207,329
6 Claims. (Cl. 99—159)

This invention relates to the curing of meat, and more particularly to an improved process for curing raw meat with nitric oxide.

In the past the curing of meat products has been a slow and arduous process. For example, the conventional process for curing of pork bellies consisted of initially injecting a curing solution and salt and sugar into the fresh bellies. The bellies are then placed in a smoke house, heated to 126° F. and smoked. This stage of the conventional process requires from about 8 to 16 hours. The cured bellies are then chilled for about 24 hours to a final temperature of about 26° F. The chilled bellies are then pressed, sliced and packaged. The curing salts used in the conventional process are nitrites and nitrates, generally sodium nitrite.

The use of these compositions in topical applications, either as a spray or a dip, has not produced satisfactory results. Although a cured color was developed, it was consistently pale or "washed out," and the product faded rapidly upon exposure to the light. Attempts to increase the intensity of this color, by increasing the concentration of nitrite, by raising the temperature of the dip, or by the use of reducing agents such as ascorbic acid or sodium iso-ascorbate did not improve the cured color of the meat products, especially when used in a rapid continuing process. Since conventional nitrite and nitrate curing agents did not give a satisfactory cured color when used in such a continuous process, even at elevated temperatures and with the addition of acid reducing agents, direct curing with nitric oxide was attempted.

It has been discovered, however, that fresh meat, especially raw bacon, when exposed to pure nitric oxide will rapidly develop an acceptable cured color when the meat is treated with acid. When fresh-raw meats are treated with nitric oxide in a rapid continuous process without this acid treatment, the products tend to exhibit the same pale, "washed-out" color produced by the conventional nitrate and nitrite curing processes. When beef or lamb are treated with nitric oxide in a continuous process without any acid pre-treatment, a cured color does result. However, this color is "borderline," sometimes commercially acceptable, sometimes not. When an acid pre-treatment is used, it has been discovered that a good cured color uniformly results.

It is therefore a primary object of the instant invention to provide an improved continuous rapid process for curing raw meat products.

Another object of the instant invention is to provide an improved method of curing meat products with nitric oxide.

Still another object of the instant invention is to provide for an acid treatment of meat which is to be cured with nitric oxide, whereby meat products having an improved cured color are produced.

Additional objects and advantages of the instant invention will be readily apparent to those skilled in the art from the attached drawings and the following detailed description.

Generally, the instant invention relates to a process for curing fresh meats comprising treating the meats with an acid prior to their curing with nitric oxide. The raw meat to be cured is contacted with sufficient acid to lower the pH of the surface of the meat to between 4 and 5 and the meat is then treated with nitric oxide gas to produce a cured meat product having an excellent red cured color. This treatment is preferably carried out in a continuous process for the rapid preparation of cured meats for sale.

No claim of inventorship is made for the apparatus disclosed in the attached drawings.

In the drawings, FIGURE 1 is a schematic diagram of one embodiment of the instant invention.

FIGURE 2 is a schematic diagram of another embodiment of the instant invention.

FIGURE 3 is a schematic diagram of another embodiment of the instant invention.

FIGURE 4 is a schematic diagram of another embodiment of the instant invention.

The instant invention deals with a process allowing the efficient and practical use of nitric oxide gas for the development of a nitric oxide hemochrome in meat products having improved stability, yielding a cured product having improved color characteristics. It has been discovered that such an improved color is produced only when the meat product is treated with an acid in conjuntion with the curing with nitric oxide gas. Various meats may be satisfactorily cured by the instant process, but it is particularly effective in curing bacon. Other meats which can be cured by our process include dried beef, sheeted meat emulsions, domestic sausage, dried sausage, bologna, salami, sliced-ham and other beef, pork, lamb and veal products.

One mode for carrying out the instant process is illustrated in FIGURE 1. Slices of the meat to be cured are cut by slicing unit 10 and deposited on conveyor 12. The slices are carried under acid sprays 14 by this conveyor where lactic acid or other suitable acid is sprayed on the slices. The acid-treated slices are then conveyed through flavor bath 16, which contains sugar and salt, and into chamber 18 which contains nitric oxide gas. The slices remain in the chamber 18 for a sufficient time to produce the desired cured color, and are then conveyed back through flavor bath 16 and through smoking unit 20, where the slices are smoked either electrostatically or by an air jet of smoke. If a dry product is desired, the slices may be dried in the smoking chamber either by a separate hot air blast or as a combination with the smoke air currents. The product is then conveyed through an air chill in chilling area 22 and deposited onto a stacking device for packaging. Washing unit 24 cleans conveyer 12 before its use on another cycle.

The concentrations of sugar and salt in the flavor bath are not critical and can be varied to achieve the desired taste. Preferred concentrations are 12–15% salt and 3–5% brown sugar.

One possible modification of the instant process is shown in FIGURE 2. Slices of meat product are prepared by slicing unit 30 and deposited on conveyor 32. The slices are then conveyed through flavor bath 34 which contains sugar, salt and acid, and into treatment chamber 36 which contains both nitric oxide and smoke. The meat remains in chamber 36 for a sufficient time to be cured and smoked to the desired degree and is then conveyed through chill bath 38 which may contain a brine solution. The meat is then deposited on a suitable stacking apparatus for packaging. The conveyor 32 is cleaned by washing unit 40 to prepare it for recycle.

Another variation of the instant process is shown in FIGURE 3. This variation is particularly useful in preparing cured dried beef. The meat from slicer 50 is deposited on conveyor 52 which is either a mesh conveyor belt or a series of individual baskets, each containing a predetermined weight of sliced beef. The sliced beef is then conveyed through flavor bath 54 which contains sugar, salt and acid, and into treatment chamber 56 wherein the meat is contacted with nitric oxide gas for a sufficient time to produce the desired cure. The meat then is conveyed back through the flavor bath 54 and into smoking chamber 58, followed by an air dryer shown generally at 60 where the beef is dried, to produce the desired product. The sliced dried beef is then chilled in chilling unit 62 and deposited on a stacker for packaging. The conveyor 52 is cleaned by washing unit 64 for recycle.

The above illustrated embodiments of the instant invention could be further modified by smoking the entire mass of meat electrostatically prior to slicing or by using a liquid smoke which could be sprayed on the slices with the acid or prior to stacking, or included in either the flavor bath or the chilling bath.

A further modification of the aforementioned illustrated process is the simultaneous contacting of the meat with an acid in the nitric oxide chamber. Also, a satisfactory cured color is produced by treating the meat with acid after it is contacted with nitric oxide.

The above processes could be further modified to be suitable for treatment of sausage emulsions such as bologna. A suitable embodiment is shown in FIGURE 4. The meat emulsion, prepared similarly to conventional emulsions except for the omission of nitrate and nitrite curing salts, is extruded from extruder 70 into a thin continuous sheet by hydraulic ram 72 onto a moving conveyor 74. The conveyor carries the material under cutting knives (dies may be substituted for these knives) which cut the material into wafers or imitation slices of the desired size and shape. The wafers are then passed through the acid spray 78, the flavor bath 80, the nitric oxide chamber 82, back through flavor bath 80, and smoking and chilling units 84 and 86 in the same manner as the other meat products hereinbefore described.

When the above processes are applied to the production of dried sausage, which has a flavor development intimately associated with specific bacteria, it is necessary to innoculate the emulsion with these particular bacteria and to allow time for their growth.

The temperature of the flavor bath used in the above processes is around 130° F.; however, this is not critical and can vary between about 125° F. and about 140° F. When employed in conjunction with meats cured by conventional methods, the above process produces a cured color of increased intensity with unexpected stability characteristics.

An important aspect of instant process is the lowering of the pH of the meat by the acid treatment preferably prior to contacting the meat with the nitric oxide curing medium. This acid treatment may be effected by spraying the slice meat with acid solution prior to dipping in the flavor bath; or by including the acid in the flavor bath along with the salt and sugar; or by simultaneously contacting the meat with acid and nitric oxide; or by treating the meat with acid after being contacted with nitric oxide. The particular acid used should be edible, but any acid or acid reacting material will produce the desired result so long as it lowers the pH to between about 4 and 5. Sulfuric, hydrochloric, citric, lactic, ascorbic, and phosphoric acids are examples of acids which may be used in the instant process. To produce the desired cured color in the meat products, however, it is necessary to reduce the pH of the meat surface to between 4 and 5 in conjunction with contacting the meat with the nitric oxide curing agent. The pH of meat ranges generally around 6 and up to 6.8. In addition to this, meat has a strong buffering action, and therefore relatively strong acid concentrations are generally necessary. Acids such as lactic and ascorbic acids are preferably used in concentrations between about 5–10%, although as it will be seen from the following examples, an acceptable color can be produced in the cured meats with a concentration as low as 0.2% lactic acid. The concentration of the various acids used can be varied so long as the pH of the surface of the meat is reduced to between about 4 and 5 by the acid treatment, and the cure is effected with nitric oxide.

The acid dip or spray process may be carried out at atmospheric pressure and the use of a vacuum is unnecessary. Extraneous oxides which might tend to contaminate the nitric oxide chamber are generally water soluble, whereas nitric oxide is not, and are quickly removed by being absorbed into the flavor bath.

The following examples, which illustrate the instant invention and its advantages, are to be considered in no way limitative, the scope of the invention being defined by the appended claims.

EXAMPLE I

This example illustrates the use of the instant process in the rapid curing of fresh sliced bacon. Bacon slabs were chilled, pressed and sliced. The slices were passed into a flavor bath containing sugar, salt and 10% lactic acid where they were exposed for about 15 seconds. The flavor bath was maintained at a temperature between about 130° F.–140° F. The conveyor then carried the slices into the nitric oxide chamber for a period of about three minutes. The slices then passed back through the flavor bath for an additional 15 seconds, and were subsequently electrostatically smoked, chilled and restacked for packaging.

Color stability tests were made on the above product by exposing it to continuous and intense light in a 38° F. cooler for five days. At the end of this period only slight discoloration was observed and the product remained commercially acceptable. The incorporation of 1% ascorbic acid dip after the nitric oxide curing showed only a slight improvement on color stability. Taste tests made on the dried product showed an agreeable flavor. The lactic acid apparently did not harm the well-known bacon flavor.

This example also serves to illustrate the usefulness of the flavor bath in the instant continuous process. This bath, in addition to containing the acid necessary to the improved cure, functions as a heating medium to raise the temperature of the meat to the desired temperature of about 130° F. The flavor bath further acts as a "gas lock" to contain the nitric oxide gas in the curing chamber; and to deposit sufficient sugar and salt on the meat slices to produce the desired flavor in the product.

Examples II, III and IV were carried out using the instant curing process in the production of dried beef, domestic sausage and dried sausage. The operating conditions in these examples are the same as those used in Example I.

EXAMPLE II

This example illustrates the use of the instant process in the rapid production of cured dried beef. The conventional production of dried beef takes from 20 to 27 days. By the use of the instant process, we are able to reduce time to several hours.

Fresh beef is tempered and sliced or chipped in an Urschel cutter. The chips are loosely packed in a stainless steel wire basket, passed through an acid bath and up into the nitric oxide chamber. Arrangements were made to rotate the basket in the chamber to expose all meat particles to the gas. The basket with the meat is then removed from the gas chamber, as per the bacon example, and dried under infrared lamps. It is then packaged via conventional processes.

EXAMPLE III

This example illustrates the use of the instant process in the rapid production of cured domestic sausage, specifically bologna.

The meat emulsion, containing spices and other ingredients known to the art, is pressed into a ribbon approximately ⅛" thick. After passage through the acid bath the emulsion is sufficiently denatured so as to develop a firm or plastic composition. The ribbon is then conveyed to the nitric oxide chamber where it is allowed to react. It is then removed to a stamping machine that cuts out defined areas for subsequent stacking and packaging.

EXAMPLE IV

This example illustrates the use of the instant process in the rapid production of cured dried sausage, in this case salami.

In the production of fermented sausage it becomes necessary to inoculate the raw meat emulsion with a sufficient number of lactic acid type bacteria, ordinarily present in smaller numbers in this type of products, to assure a rapid-production of their metabolic products for proper flavor development. This may take several days at "green room" temperatures. The fermented emulsion is then conveyed as a thin ribbon into the nitric oxide chamber for the development of cured color, as shown above.

The following table shows the effects of hydrogen ion concentration on the color development of fresh meat exposed to nitric oxide. These tests were carried out on fresh lean meat which was removed from raw bacon slices, ground and composited. The color ratings were determined by averaging the evaluations of a judging panel. A rating of 10 is "excellent," 6 is the "minimum acceptable" and less than 6 is "unacceptable." The meat was exposed to nitric oxide for a period of 5 minutes for curing.

Table I

| Additive weight percent: | Color rating after cooking |
|---|---|
| 5.0 $H_2O$ | 3.0 |
| 0.02 ascorbic acid | 3.5 |
| 0.2 lactic acid | 6.5 |
| 5.0 lactic acid | 8.0 |
| 10.0 lactic acid | 8.5 |
| 0.1 $H_2SO_4$ | 8.5 |
| 0.1 HCl | 8.0 |
| 0.2 sodium ascorbate | 6.0 |
| 5.0 sodium lactate | 3.0 |

The above table clearly shows that an acceptable color is developed in raw cured meat only when a sufficiently high acid concentration is used. That the hydrogen ion concentration resulting from the use of the acid is a critical factor is illustrated by the unacceptable color produced using a relatively high concentration of sodium lactate.

The five minute treatment time with nitric oxide used in the above table of examples is not critical, and any treatment time above about 1 minute will produce the desired result. The upper limit of treatment times with nitric oxide is determined only by the extent of cure desired and other commercial factors, although no improvement apparently results from treating longer than about 10 minutes; however this depends on the thickness of the meat being cured.

Table II illustrates the effect of the pH of the surface of the meat product on the cured color resulting from a nitric oxide cure. The curing time of the samples was 5 minutes. The meat used in these tests was a beef emulsion. After curing, the meat samples were steam cooked for 2 minutes and the color was rated by a panel on the same basis as that used in Table I.

Table II

| Additive, weight percent | Emulsion pH | Color Rating |
|---|---|---|
| 0.02 $H_2O$ | 5.60 | 3.0 |
| 0.02 ascorbic acid | 5.51 | 3.5 |
| 0.02 lactic acid | 5.40 | 4.0 |
| 0.2 lactic acid | 5.00 | 6.5 |
| 5.0 lactic acid | 4.80 | 8.0 |
| 10.0 lactic acid | 4.40 | 8.5 |
| 0.2 sodium ascorbate | 6.10 | 2.0 |
| 0.2 sodium lactate | 6.3 | 1.5 |

The above table shows that a desirable color in the raw cured meat is produced at a pH between about 4 and 5. Adjustment of the pH below 4 offers no further improvement, and a pH of more than 5 fails to produce an acceptable cured color.

Many modifications and variations of the instant invention can be derived without departing from the spirit and scope thereof; the scope of the invention should therefore be limited only by the scope of the appended claims.

I claim:
1. A process of curing meat comprising: contacting meat with an edible acid at a temperature from about 125° F. to about 140° F. to lower the pH of the meat surface to at least 4.8 and contacting said meat with nitric oxide gas for above about 1 minute.

2. The process of claim 1, wherein the meat is contacted with the acid prior to contacting with the nitric oxide gas.

3. The process of claim 1, wherein the meat is in the form of slices.

4. The process of claim 1, wherein the acid is lactic acid.

5. A process of curing meat comprising: contacting meat with an edible acid at a temperature of from about 125° F. to about 140° F. to lower the pH of the meat surface to at least 4.0 and contacting said meat with nitric oxide gas for above about 1 minute.

6. A process of curing meat comprising: contacting meat with an edible acid at a temperature of from about 125° F. to about 140° F. to lower the pH of the meat surface to between about 4.0–4.8 and contacting said meat with nitric oxide gas for above about 1 minute.

References Cited by the Examiner
UNITED STATES PATENTS

| 2,627,473 | 2/1953 | Brissey | 99—159 XR |
| 2,847,312 | 8/1958 | Harper | 99—159 |
| 2,930,703 | 3/1960 | Harper | 99—159 |
| 3,033,687 | 5/1962 | Harper | 99—159 XR |
| 3,051,579 | 8/1962 | Hammes | 99—159 |

A. LOUIS MONACELL, *Primary Examiner.*

HYMAN LORD, *Examiner.*